United States Patent [19]

Bouilloux et al.

[11] Patent Number: 5,056,549
[45] Date of Patent: Oct. 15, 1991

[54] VALVE FLUID CONTROL DEVICE AND FLUID BACKFLOW PROTECTION DEVICE COMPRISING SAME

[75] Inventors: Christian Bouilloux, Tournus; Pierre Marmol, Chalon/Saone; Jean Richard, St Marcel, all of France

[73] Assignee: Socla, Chalon sur Saone, France

[21] Appl. No.: 380,070

[22] Filed: Jul. 14, 1989

[30] Foreign Application Priority Data

Jul. 15, 1988 [FR] France ............................ 88 09643

[51] Int. Cl.$^5$ .................. F16K 25/00; F16K 3/24; F16K 5/04; F16K 24/02
[52] U.S. Cl. .................................. 137/218; 137/312; 137/625.47
[58] Field of Search ............... 137/218, 625.47, 312

[56] References Cited

U.S. PATENT DOCUMENTS

| | | | |
|---|---|---|---|
| 1,648,486 | 11/1927 | Larsen | 137/312 |
| 1,708,273 | 4/1929 | Larsen | 137/312 |
| 2,038,132 | 4/1936 | Robinson et al. | 137/312 |
| 2,484,622 | 10/1949 | Hartman | 137/312 |
| 2,631,001 | 3/1953 | Griswold | 137/312 |
| 3,101,740 | 8/1963 | Ray | 137/312 |
| 3,191,628 | 6/1965 | Kirkwood et al. | 137/312 X |
| 3,459,212 | 8/1969 | Campion . | |
| 3,512,546 | 5/1970 | King | 137/312 |
| 3,605,792 | 9/1971 | Westbrook | 137/312 |
| 3,658,093 | 4/1972 | Kirkwood | 137/312 X |
| 3,724,487 | 4/1973 | Hunter | 137/218 |
| 3,827,285 | 8/1974 | Grove | 137/312 X |
| 4,067,352 | 1/1978 | Halpine | 137/312 |
| 4,108,199 | 8/1978 | Bonafous | 137/312 |
| 4,314,579 | 2/1982 | Wheatley et al. | 137/312 |
| 4,326,671 | 4/1982 | Goguen | 137/218 X |
| 4,327,765 | 5/1982 | Wilson et al. | 137/312 |
| 4,410,001 | 10/1983 | Goguen | 137/218 X |
| 4,427,177 | 1/1984 | Constantinescu et al. | 251/315 X |
| 4,478,236 | 10/1984 | Neuzeret et al. | 137/218 X |
| 4,506,697 | 3/1985 | Marchant | 137/312 |
| 4,589,438 | 5/1986 | Breda | 137/218 |
| 4,681,133 | 7/1987 | Weston | 137/625.47 X |
| 4,749,002 | 6/1988 | Lembser | 137/312 X |

FOREIGN PATENT DOCUMENTS

| | | |
|---|---|---|
| 0641679 | 8/1928 | France . |
| 0703758 | 5/1931 | France . |
| 0586166 | 3/1947 | United Kingdom . |
| 1151215 | 5/1969 | United Kingdom . |
| 2064730 | 6/1981 | United Kingdom . |

OTHER PUBLICATIONS

PCT International Publication No. WO84/02547, Published Jul. 5, 1984.

Primary Examiner—Gerald A. Michalsky
Attorney, Agent, or Firm—Browdy and Neimark

[57] ABSTRACT

A valve designed for the prevention of leakage between two or more ports when the valve is in its off position and where leakage occurs at a port seal as shown and described. In this design, each port is sealed when the valve is in the off position, and an open area vented to atmosphere is provided between each of the port seals, whereby if a seal should leak, the fluid will pass to the atmosphere by way of a vent, and will not come in contact with any other sealed port in the valve. The vented chamber separates each port seal from other port seals in the valve. The vented chamber is exterior to the valve and is not a part of the inside of the valve member such as a passage therethrough.

22 Claims, 12 Drawing Sheets

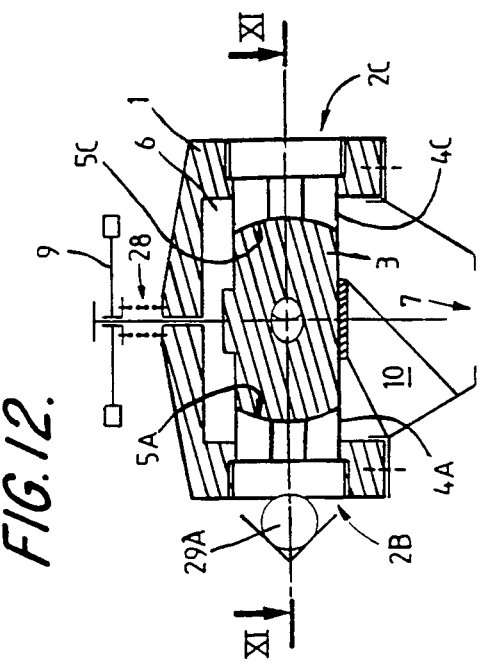
FIG.12.
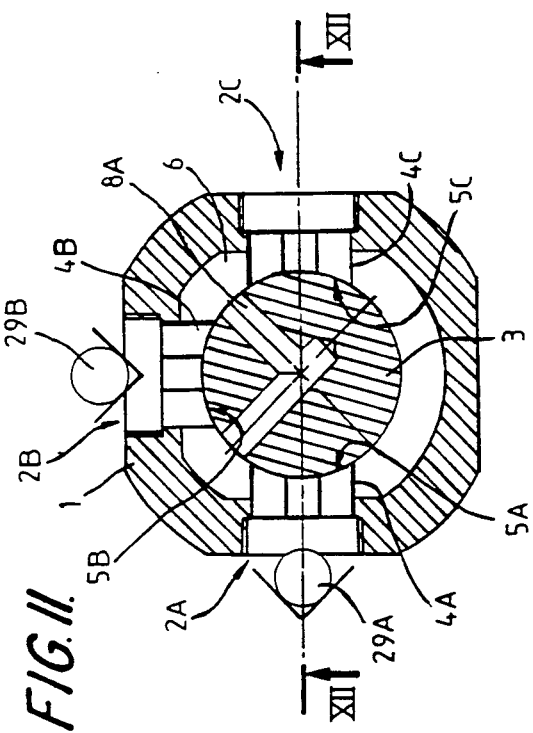
FIG.11.
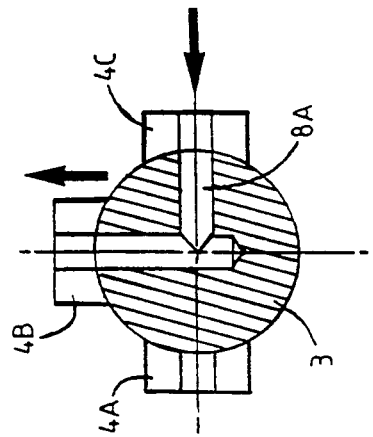
FIG.14.
FIG.13.

VALVE FLUID CONTROL DEVICE AND FLUID BACKFLOW PROTECTION DEVICE COMPRISING SAME

BACKGROUND OF THE INVENTION

1. Field of the Invention

The present invention relates to a valve comprising a valve body provided with at least first and second ports adapted to be connected to a fluid pipe and a mobile valve member within the body having a closed position in which it closes off said ports and an open position in which the ports are placed in communication by way of a passage in the valve member.

2. The Prior Art

In conventional embodiments of this type of valve, should the sealing be defective fluid is also able to pass between the two ports in the closed position.

DESCRIPTION OF THE INVENTION

The invention is directed to solving the problem of finding a valve which does not have this disadvantage. To this end it proposes a valve of the same kind but which is characterised in that it comprises respective sealing areas which in the closed position of the valve seal the first and second ports, together with a chamber disposed in the closed position of the valve between said sealing areas and provided with a vent opening to free air for venting it to the atmosphere and through which any leakage at said sealing areas can be removed.

If one of the areas is leaking then the leaking fluid would have to pass through the chamber up to the other sealing area and then pass through this for the fluid to pass between the two ports. Because of the vent with which the chamber is provided, however, any fluid in the chamber is at atmospheric pressure and so cannot cross the second sealing area, being collected in the chamber and removed therefrom via the vent. The vent is preferably in the lower part of the valve so that no fluid can remain in its bottom part and, depending on the risks that leaks could represent in the premises where the valve is installed, a recovery device (a kind of funnel) could be provided for the leaking fluid removed from the valve, leading to a drain.

A valve of this kind is particularly advantageous from the safety point of view since it provides totally reliable isolation between two circuits which must be connected in certain circumstances but the fluids in which must not otherwise mix.

These might be, for example, the drinking water supply system and the water circuit of a central heating installation, which must be isolated from each other except when the heating circuit is being filled: it is necessary to avoid overfilling of the heating circuit by the water system and above all essential to prevent water from the heating circuit passing into the drinking water system which would thereby be polluted. It will be noted that the risks of any such incident occurring is relatively high given the excess pressures that are likely to occur in the heating circuit in the event of overheating.

The valve which has just been described can also be associated with complementary means to provide a more sophisticated fluid control device, which constitutes another aspect of the invention, or to provide a device protecting against backflow of fluids, which constitutes a further aspect of the invention.

The device to which the invention relates in this latter aspect is characterised in that it comprises a valve as previously described adapted to be placed between a fluid supply system and a consumption installation, a supply pipe being adapted to be connected to said first port and an installation pipe to said second port; a non-return valve mounted on at least one of said first and second ports, closing in the direction towards the supply or opening in the direction towards the installation; a system for controlling the valve member of the valve adapted to be connected respectively to the supply pipe and to the installation pipe, respectively upstream or downstream of the non-return valve mounted on the first or second port, comprising means for moving the valve member to the closed position if the pressure in the installation pipe is higher than the pressure in the supply pipe.

In the case where fluid tends to pass from the installation to the supply, the non-return valve on the installation and/or supply port closes and the pressure in the installation pipe becomes higher than the pressure in the supply pipe, which causes the valve member to move to the closed position.

In these circumstances, and given the characteristics of the valve, the device disconnects the installation from the supply, by which is meant that its installation port and its supply port are both closed while the portion of the device situated between the closure areas is vented to the atmosphere.

The protection device in accordance with the invention has the advantage of fulfilling its function with a particularly simple and economical structure, while offering a particularly high level of safety, even in the case where there is only one non-return valve: should this be jammed in a part-open position by a particle the fluid would still have to pass through the valve to reach the supply pipe.

The fluid control device to which the invention relates in another aspect is characterised in that it comprises a valve as previously described adapted to be placed between a fluid supply system and a consumption installation, a supply pipe being adapted to be connected to said first port and an installation pipe to said second port; a non-return valve on at least one of said first and second ports, closing towards the supply or opening towards the installation, and preferably a non-return valve on each of the first and second ports.

A control device of this kind is particularly advantageous since it has the function not only of enabling communication between and isolating from each other the supply and the installation, by operation of the valve member, but also a disconnection function in the closed position and a protective function against backflow in the open position.

For additional safety in the open position the valve body advantageously further comprises a port for mounting a vacuum-breaker valve and the valve member comprises a passage adapted in the open position of the valve to connect the vacuum-breaker mounting port with the first and second ports.

In a control device comprising a valve of this kind and its vacuum-breaker (that is to say a valve having one side communicating with the atmosphere), the passage is vented to the atmosphere when the valve member is in the open position between the first and second ports and the vacuum-breaker is open. The vacuum-breaker may be a simple device, meaning that it opens when in the open position of the valve the pressure in the passage is less than atmospheric pressure. When the valve is in the open position the vacuum-breaker therefore opens if there is an accidental pressure drop in the drinking water supply (to return to the previously used example).

The vacuum-breaker could equally well be a differential device, that is to say it could react to a difference in pressure, preferably between the pressure in the passage and the pressure in the supply pipe.

In more precise terms, in this case a non-return valve is mounted on the first port and the vacuum-breaker is adapted to be connected to the supply pipe upstream of said non-return valve, the vacuum-breaker incorporating means for opening it when, in the open position of the valve, the pressure in the passage is higher than the pressure in the supply pipe.

If there is any tendency for the fluid to flow from the installation towards the supply and there is no non-return valve on the installation pipe, or if there is one but it is defective, the non-return valve on the supply pipe closes and the pressure in the passage becomes higher than the pressure in the supply pipe, which opens the vacuum-breaker.

It is also possible to use a differential vacuum-breaker responding to the difference between the pressures in the supply and installation pipes and connected to the pipes respectively upstream and downstream of the non-return valve mounted on the first or second port.

In both cases the differential vacuum-breaker opens if the pressure equilibrium is abnormal, in particular (returning to the previous example) if the pressure in the heating water circuit becomes higher than that of the drinking water supply following an accidental pressure drop in the drinking water supply or an abnormal pressure rise in the heating circuit.

Thus if the control device also comprises a non-return valve on each of the installation and supply ports the disconnection conditions apply in the open position of the valve in circumstances likely to cause backflow of fluid. Protection against any such backflow is therefore secured, whether the valve member is in the closed position or the open position.

Depending on the application intended for the valve in accordance with the invention, it may be manufactured with more than two ports adapted to be connected to a fluid pipe and with or without a port for mounting a vacuum-breaker.

The body comprises, for example, a third port adapted to be connected to a fluid pipe and the valve member comprises a passage adapted so that the third port is also closed in the closed position of the valve and so that the valve member has on each side of the closed position an open position in which said second port is placed in communication with the first or the third port, respectively, while the third or the first port, respectively, is closed; said chamber is also disposed, in the closed position of the valve, between at least one of the areas respectively sealing the first and the third ports or those respectively sealing the second and the third ports.

This embodiment may be used, for example, by connecting the first port to a drinking water supply pipe, the second port to a user installation pipe and the third port to a pipe connected to a well: in the closed position of the valve the three pipes are shut off; in a first open position the supply pipe and the installation pipe are placed in communication while the well pipe is shut off; in the second open position the well pipe and the installation pipe are placed in communication while the supply pipe is shut off. The installation is therefore supplied in each open position of the valve either from the main or from the well, respectively.

The chamber, which is always between the supply and installation ports, protects the supply in the closed position not only from the installation but also from the well, both of which can pollute the supply, provided that it is also placed between the supply and well ports.

If the chamber is also between the installation and well ports the latter are protected and if all the ports are separated from each other by the chamber the protection is total, the fluid being unable to pass between any pair of the fluid ports of the valve.

The characteristics, particularities and advantages of the invention will emerge from the description of various embodiments given hereinafter by way of non-limiting example and with reference to the appended drawings. In the latter:

BRIEF DESCRIPTION OF THE DRAWINGS

FIGS. 11 and 12 are views respectively in plan and in elevation, in cross-section at XI—XI in FIG. 12 and at XII—XII in FIG. 11, of a fluid control device in accordance with the invention comprising a three-port embodiment of the valve from FIGS. 1 and 2 and two non-return valves, the three-port valve being shown in the closed position;

FIGS. 13 and 14 are schematic representations of the two open positions of this valve;

DETAILED DESCRIPTION OF THE PREFERRED EMBODIMENT

Figure 1:
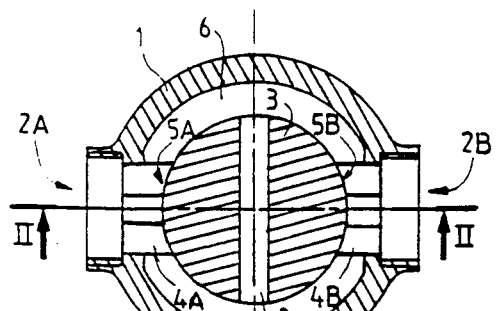
FIGS. 1 and 2 are views respectively in plan and in elevation, in cross-section at I—I in FIG. 2 and at II—II in FIG. 1, of a two-port valve in accordance with the invention in the closed position, in which valve the valve body is a shell casing and the valve member turns.
Figure 2:
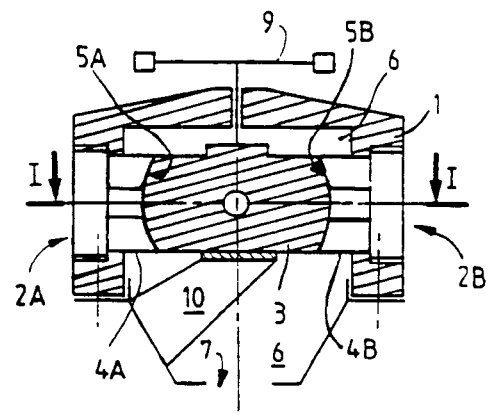

In the valve shown in FIGS. 1 and 2 the valve body is a shell casing 1 with first and second ports 2A and 2B adapted to be connected to a fluid pipe and the valve member 3 is mounted to rotate in the shell casing by means of sleeves 4A and 4B coaxial with the ports 2A and 2B. In the position shown the valve member is in a closed position in which it closes off the ports, sealing being provided by the respective contact areas 5A and 5B between the sleeves 4A and 4B and the valve member. Because the sleeves project to a significant degree relative to the inside wall of the shell casing (in comparison with conventional valves of this kind) there is a space between the shell casing and the valve member which forms a chamber 6 disposed in the closed position of the valve between the sealing areas 5A and 5B. This chamber is provided with a port 7 venting it to the atmosphere and for removing any leakage in the areas 5A and 5B, as previously explained.

By rotating it one quarter turn from the position shown the valve member is placed in an open position in which the diametral passage 8 in it places the ports 2A and 2B in communication. This manoeuvre is effected by operating a control handwheel 9 situated at the top of the valve and linked to the valve member 3, abutment members (not shown) being provided for accurately locating the latter in the open or closed position.

Note that one eight-turn is sufficient for moving the valve member from one of these positions to the other.

The vent 7 in the chamber 6 is in the bottom part of the valve so that no fluid can remain in the bottom part of the valve. The valve member is spherical (to be more precise, part-spherical) and a lug 10 is provided to support it.

It will be noted that, in accordance with one preferred characteristic of the invention, the thickness of the sleeves 5A and 5B is at least equal to the diameter of the passage 8.

This has the advantage of avoiding, on changing between the open and closed positions, the passage being simultaneously facing with the chamber 6 and with one of the ports, which would cause a flow of fluid from the port concerned to the chamber.

Here this characteristic is implemented by giving the passage a particularly small diameter, notably in comparison with that of conventional valves of this kind.

Figure 3:
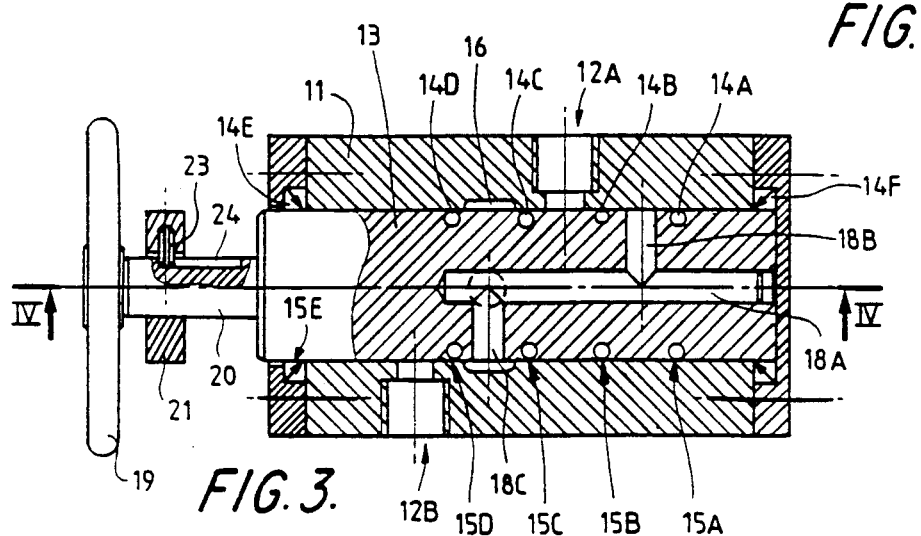
FIGS. 3 and 4 are views respectively in plan and in elevation, in cross-section at III—III in FIG. 4 and at IV—IV in FIG. 3, of a two-port valve in accordance with the invention in the closed position, in which valve the valve body is a cylinder and the valve member is a position.
Figure 4:
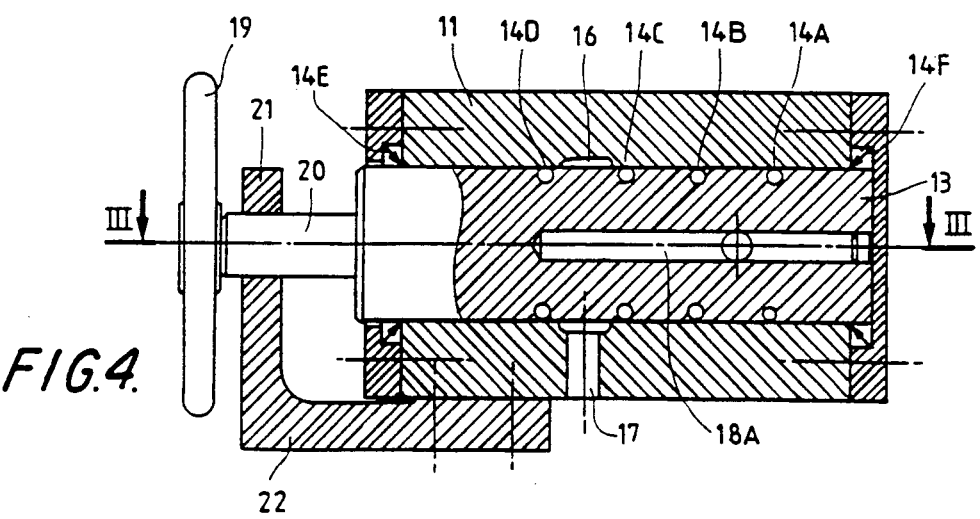

In the valve shown in FIGS. 3 and 4 the valve body is a cylinder 11 provided with first and second ports 12A and 12B formed in the lateral wall of the cylinder, axially offset relative to each other and adapted to be connected to a fluid pipe, and the valve member is a piston 13 sliding in said cylinder, having on its lateral wall on either side of each of the orifices of its passage annular grooves in each of which is disposed an O-ring seal 14A through 14D, the cylinder being closed at its ends by end-pieces each provided with a lip seal, respectively 14E and 14F. The valve is shown in the closed position in which the piston closes off ports 12A and 12B, sealing being obtained in the areas of contact 15B and 15C between the O-ring seals 14B and 14C and the wall of the cylinder for the port 12A and in the areas 15D and 15E corresponding to the seals 14D and 14E for the port 12B. The cylinder wall incorporates an annular recess between the ports 12A and 12B which forms a chamber 16 disposed, in the closed position of the valve, between the areas 15C and 15D. This chamber is provided with a vent 17 for venting it to the atmosphere and for removing any leaks in the areas 15C and 15D, as previously explained.

By moving it towards the left (as seen in FIGS. 3 and 4) the piston is placed in an open position in which its passage, comprising an axial portion 18A joined to two radial portions 18B and 18C, places the ports 12A and 12B in communication. The manoeuvre is effected by operating a control handle 19 coaxial with the valve and linked to the piston 13 by a rod 20 which slides in a bracket 21 fixed to the cylinder by a lug 22. In the bracket is mounted a peg 23 cooperating with a groove 24 in the rod 20, firstly to locate it in the angular direction and secondly to locate the piston in the axial direction when the peg 23 butts up against the ends of the groove, the open position of the valve then corresponding to the peg abutting the opposite end to that it is shown abutting here.

Figure 5:
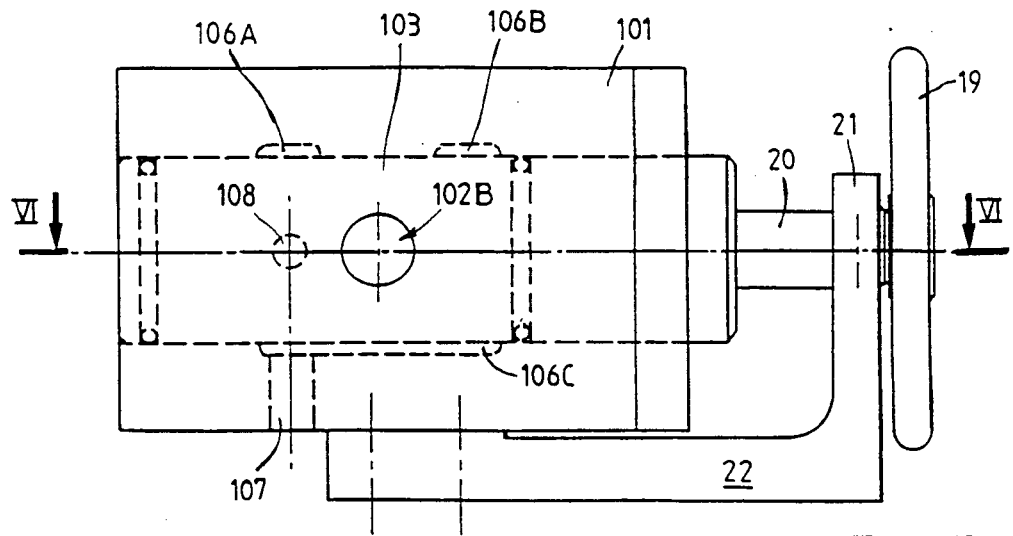
FIG. 5 is a view in elevation of another two-port valve in accordance with the invention in the closed position, in which valve the valve body is a cylinder and the valve member is a piston.
Figure 6:
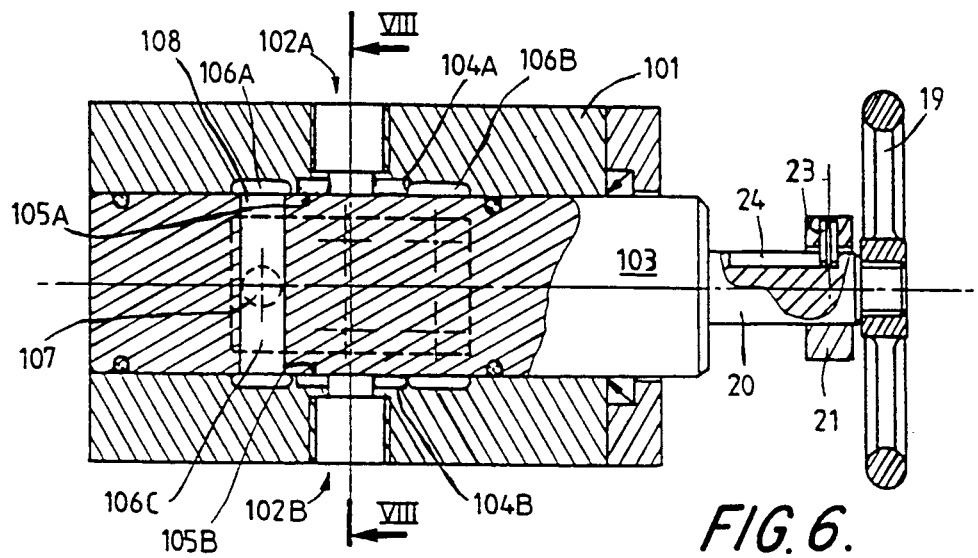
FIGS. 6 and 7 are respectively views in cross-section on the lines VI—VI and VII—VII in FIGS. 5 and 6, the lug 22 not being shown in FIG. 7.
Figure 7:
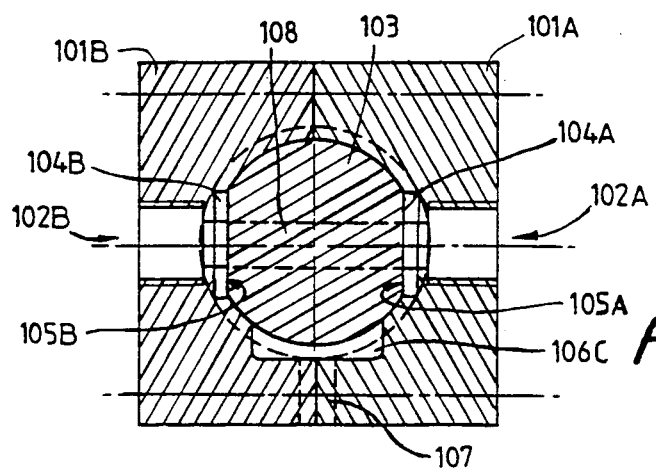

In the valve shown in FIGS. 5 through 7 the valve body is a cylinder 101 in the lateral wall of which are diametrally opposed first and second ports 102A and 102B adapted to be connected to a fluid pipe and the valve member is a piston 103 sliding in said cylinder. The latter comprises for each of the ports 102A and 102B a recess coaxial with the port in which is disposed an annular seal 104A and 104B, into which the respective ports open and against which the piston 103 slides. The valve is shown in the closed position in which the piston closes off the ports 102A and 102B, sealing being obtained in the areas of contact 105A and 105B between a flat on the cylinder 103 and the seals 104A and 104B. The inside wall of the cylinder 101 includes annular recesses 106A and 106B on either side of the ports 102A and 102B and a longitudinal recess 106C at the bottom into which the recesses 106A and 106B open and also a vent 107 venting to the atmosphere. The recesses 106A through 106C thus form a chamber disposed, in the closed position of the valve, between the areas 105A and 105B which vents to the atmosphere and removes any leaks that may occur, as previously explained.

By moving it to the right (as seen in FIGS. 5 and 6) the piston 103 is placed in an open position in which its diametral passage 108 places the ports 102A and 102B in communication. The operating system with locating abutments is similar to that of the valve from FIGS. 3 and 4.

It will be noted that, as shown in FIG. 7, to facilitate its manufacture the cylinder 101 is made up of two half-cylinders 101A and 101B joined together.

Figure 8:
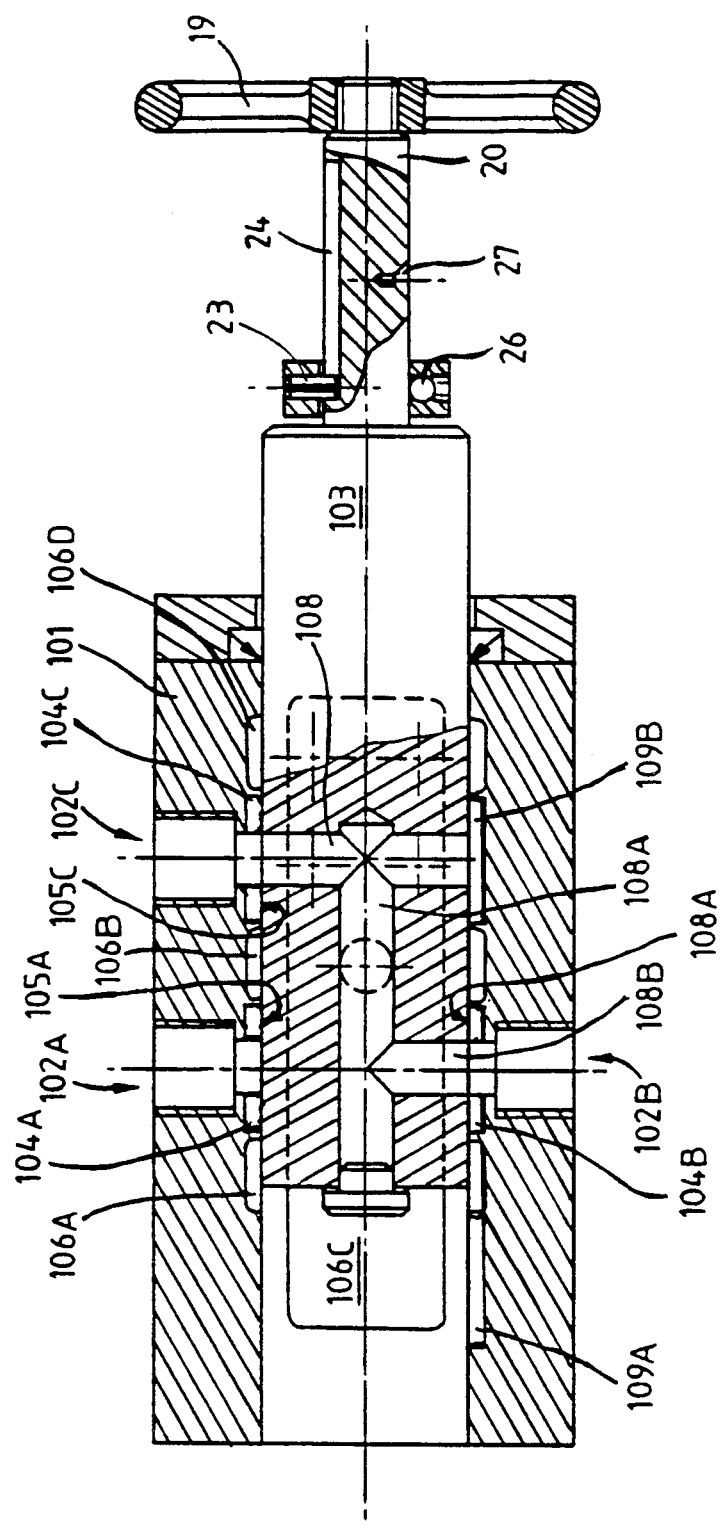
FIGS. 8 through 10 are views similar to FIG. 6 of a three-port embodiment of the valve from FIGS. 5 through 7, respectively in a first open position, a closed position and a second open position.
Figure 9:
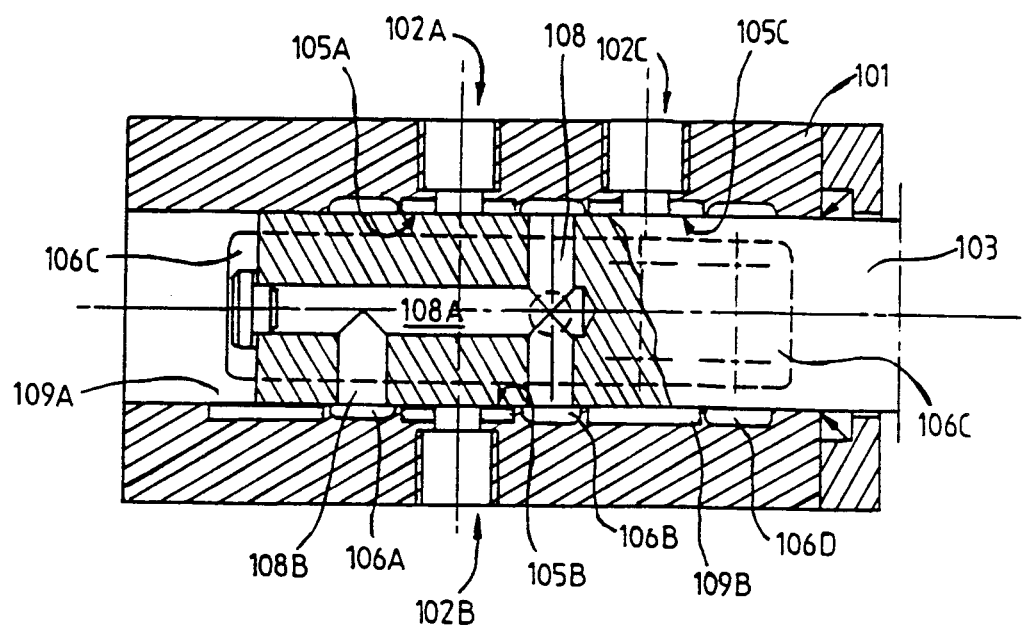
Figure 10:
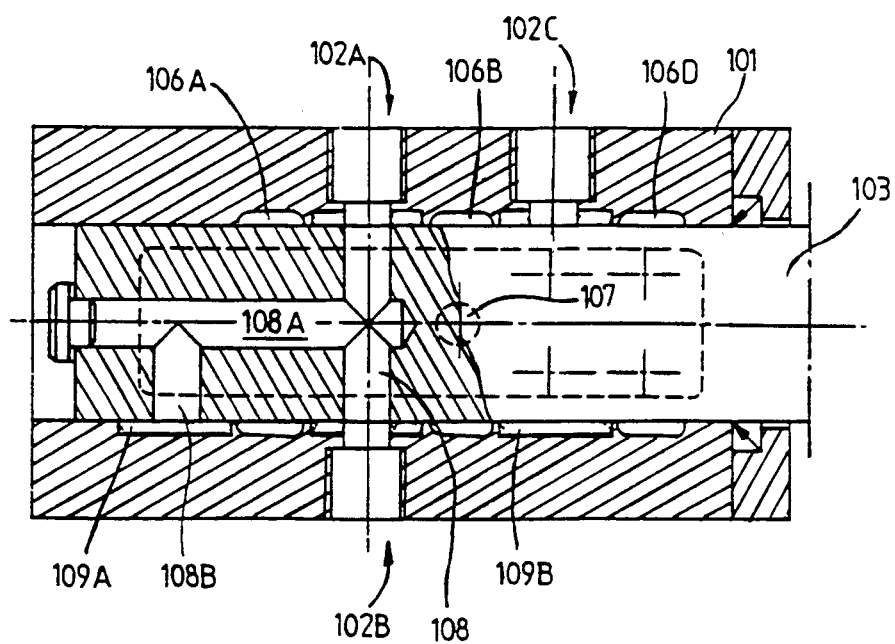

In the embodiment shown in FIGS. 8 through 10 the cylinder 101 further comprises a third port 102C adapted to be connected to a fluid pipe, axially offset relative to the ports 102A and 102B and on the opposite side of the recess 106B to the latter, a third annular recess 106D being formed on the opposite side of the third port 102C, and the passage in the piston has a diametral portion 108 joined to an axial portion 108A joined to a radial portion 108B.

In the closed position (shown in FIG. 9) the orifices of the diametral portion 108 are aligned with the annular recess 106B while the orifice of the radial portion is aligned with the recess 106A. The three ports 102A through 102C are therefore closed, sealing being obtained in the areas 105A and 105B for the ports 102A and 102B and in an area 105C for the port 102C, a seal 104C similar to the seals 104A and 104B being provided at this port.

On each side of this closed position the piston 103 has a respective open position in which the port 102B is in communication with the port 102A while the port 102C is closed (FIG. 10) or with the port 102C while the port 102A is closed (FIG. 8).

The valve is changed from the closed position to one of the open positions by operating the handle 19 to move the piston through a distance equal to one-half the offset between the ports 102A (or 102B) and 102C, towards the right or towards the left, as appropriate to the required open position.

The bracket 21 further comprises a spring-loaded indexing ball 26 and the rod 20 incorporates a corresponding hole 27 at the mid-travel position: when the ball 26 is in the hole 27 the valve is closed and when the peg 23 is in abutment with either end of the groove 24 the valve is open.

It will be noted that pads 109A and 109B similar to the seals 104A through 104C but with no central hole are provided for sealing the unused orifice of the passage in each of the open positions of the valve.

In the alternative embodiment of the valve from FIGS. 1 and 2 shown in FIGS. 11 through 14 the shell casing 1 further comprises a port 2C adapted to be connected to a fluid pipe, the first and third ports 2A and 2C being diametrally opposed on a first diameter and the second port being disposed on a diameter transverse to said first diameter; a sleeve 4C is provided for the port 2C and the passage 8A of the valve member 3 is L-shaped.

In the closed position (FIGS. 11 and 12), the orifices of the passage are respectively disposed between the second and the first ports 2B and 2A and between the second and the third ports 2B and 2C.

The three ports 2A through 2C are closed, sealing being obtained by the respective valve member-sleeve contacts. It will be noted that in this position the chamber is between the areas 5A and 5B sealing the first and second ports, between the areas 5A and 5C sealing the first and third ports and also between the areas 5B and 5C sealing the second and third ports.

On each side of the closed position the valve member 3 has a respective open position in which the port 2B is in communication with the port 2A while the port 2C is closed (FIG. 13) or in communication with the port 2C while the port 2A is closed (FIG. 14).

The valve is changed from the closed position to one of the open positions by operating the control handle 9 to rotate the valve member through one eighth-turn in one direction or the other, according to the required open position. An indexing device 28 equivalent to the system of the valve from FIGS. 8 through 10 is provided so that the valve member is against an abutment in each of its open positions and indexed at mid-travel, that is to say in its closed position.

It will be noted that in each of the valves that have just been described the valve member is mounted in the valve body in such a way as to remain in contact as it moves with the edge of the orifices through which at least the first and second ports respectively open into the valve body. This has the advantage of preventing any particles that may be present in the fluid becoming trapped between the valve member and the edge of an orifice, preventing the valve from being closed, which advantage is particularly beneficial in the case where the valve has to be closed automatically as in devices protecting against backflow of fluid such as will be described later with reference to FIGS. 25 through 27.

The valves which have just been described are reversible, that is to say fluid can flow through them in either direction; it is therefore possible to fit them between circuits where fluid can flow in both directions.

It is consequently necessary to add non-return means to the valve if it is to be used as a control device between circuits in which the fluid must flow in one direction only, for example between a drinking water supply and a consumption installation, a supply pipe being connected to the first port 2A, 12A or 102A and an installation pipe to the second port 2B, 12B or 102B, and there being a possibility of the installation polluting the drinking water supply.

Thus in the fluid control device shown in FIGS. 11 through 14 in which the third port 2C is connected to a well, for example, a non-return valve 29B is fitted to the port 2B (installation), opening towards the installation. The fluid can therefore flow only towards the installation in the open position of the valve, that is to say from the supply to the installation in the first open position (FIG. 13) or from the well to the installation in the second open position (FIG. 14).

To avoid the risk of backflow into the supply main there is also provided a non-return valve 29A on the port 2A (supply), closing towards the supply. The prevention of backflow from the installation is thus doubly safe. It will be noted that it is also possible, depending on the safety conditions required, to provide a non-return valve on the port 2C also, closing towards the well, or just one valve on one of the ports 2A, 2B or 2C.

The valve shown in FIGS. 8 through 10 can be used in a similar way, its ports 102A, 102B and 102C corresponding to the ports 2A, 2B and 2C, and may be combined similarly with one or more non-return valves.

It will be noted that in both embodiments and in the closed position of the valve the chambers 6 and 106A through 106D make it possible to prevent entry into the supply (port 2A or 102A) of water from the installation or of water from the well by virtue of these chambers being placed between the corresponding sealing areas, and also that the well (port 2C or 102C) is isolated from the installation (port 2B or 102B).

It will be observed that the fact that it is necessary to pass through the closed position between the two open positions makes it inevitable that at least one orifice of the passage in the valve member 3 or 103 will be opened into the chamber 6 or 106A through 106D, with the result that the liquid contained there is vented to the atmosphere, is collected in the chamber and flows out through its orifice. The residual liquid in the passage therefore cannot pollute any circuit connected to the valve.

The two-port valves from FIGS. 1 through 7 can also be used between a supply pipe connected to the first port 2A, 12A or 102A and an installation pipe connected to the second port 2B, 12B or 102B and combined with a non-return valve mounted on at least one of the first and second ports, closing towards the supply and opening towards the installation, and preferably with a non-return valve on each of the first and second ports, so that the arrangement is doubly safe.

Figure 15:
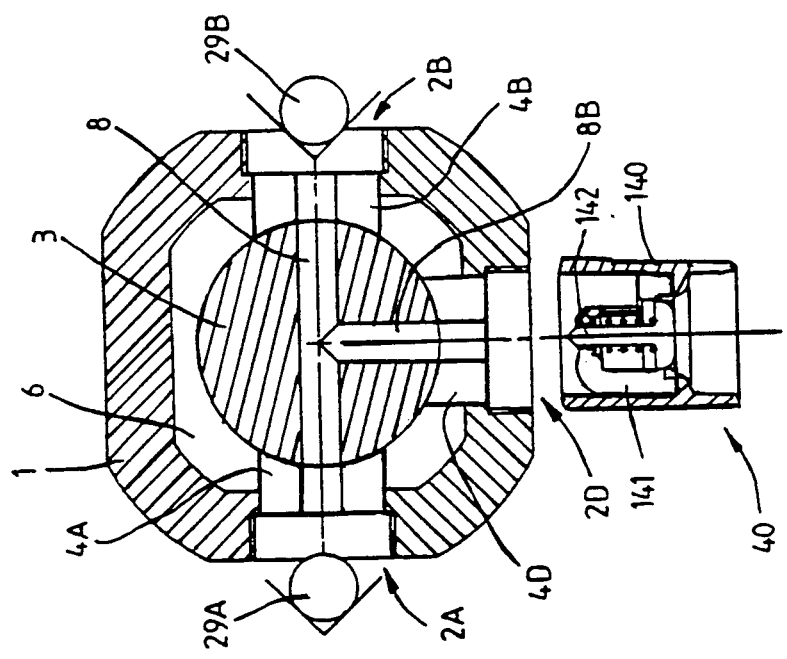
FIG. 15 shows in a similar way to FIG. 1 a fluid control device comprising an alternative embodiment of the valve from FIGS. 1 and 2 provided with a port for mounting a vacuum-breaker, a non-return valve on each of the fluid ports and a simple vacuum-breaker.

The valve forming part of the operating device in FIG. 15 is similar to the valve from FIGS. 1 and 2 except that its shell casing further comprises a port 2D for mounting a vacuum-breaker valve disposed on a diameter transverse to that on which the first and second ports 2A and 2B are disposed, with a corresponding sleeve 4D, and the passage in the valve member is T-shaped, that is to say it comprises in addition to the diametral portion 8 a radial portion 8B connecting transversely to the centre of the latter. In the closed position of the valve the orifice of the radial portion 8B is disposed between the port 2D and the port 2A or 2B, so that the three ports 2A, 2B and 2D are therefore closed, sealing being obtained by the respective valve member-sleeve contact. By rotating it through one eighth-turn, anticlockwise if the orifice of the portion 8B is to be placed between the ports 2A and 2D or clockwise if the ports 2B and 2D are selected, the valve member is placed in its open position, shown in FIG. 15, in which the vacuum-breaker mounting port 2D is connected to the ports 2A and 2B. The valve is operated by acting on means comprising, as in the valve from FIGS. 1 and 2, a control handwheel and abutment members corresponding to the open and closed positions.

The fluid control device shown is adapted to be fitted between a supply main and a consumption installation, a supply pipe being adapted to be connected to the port 2A and an installation pipe to the port 2B. It comprises in addition to the valve a respective non-return valve 29A and 29B mounted on each of the first and second ports, closing towards the supply main and opening towards the installation, and a simple vacuum-breaker valve 40 adapted to be mounted in the port 2D. The valve 40 is a non-return valve closing towards the atmosphere and comprises a body 140 in which is mounted, by means of a star-shaped support 141, a valve member 142 cooperating with a valve seat of the body 140.

In the event of a pressure drop in the upstream pipe relative to atmospheric pressure, and if there is no valve 29A, or if there is a valve but it is defective, the pressure in the passage becomes lower than atmospheric pressure, the vacuum-breaker opens and the passage is vented to atmospheric pressure.

Figure 16:
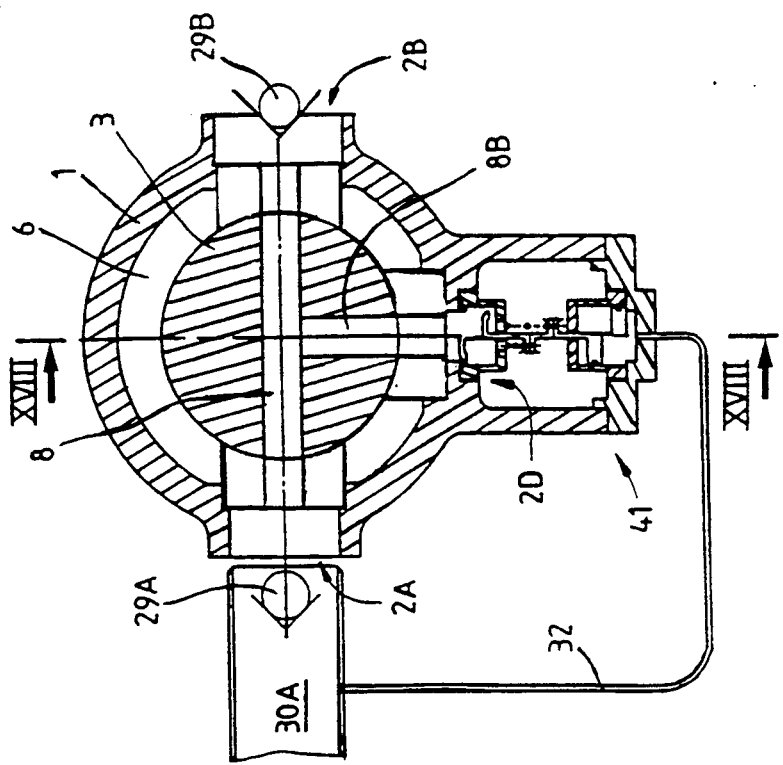
FIG. 16 shows in a similar way to FIG. 15 an alternative embodiment of the device from FIG. 15 in which the vacuum-breaker is a differential device responsive to the difference between the pressure in the passage and the pressure in the supply pipe, the lefthand part of the figure showing the vacuum-breaker closed and the righthand part showing it open.
Figure 17:
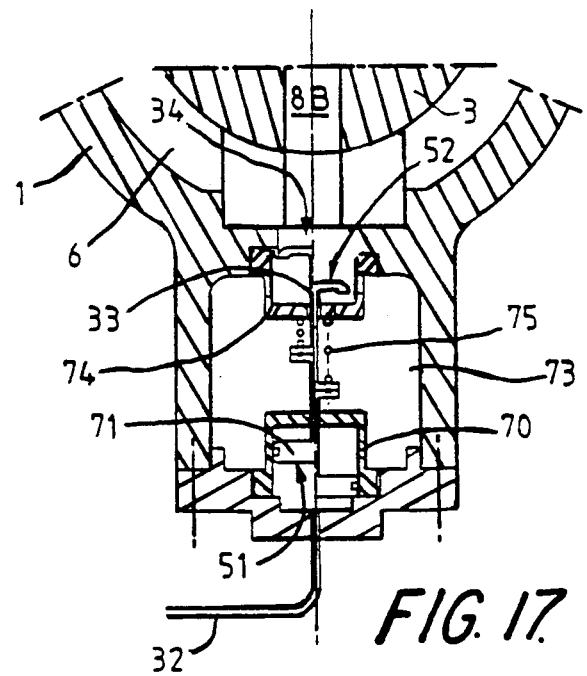
FIG. 17 is a detail view showing the vacuum-breaker to a larger scale.
Figure 18:
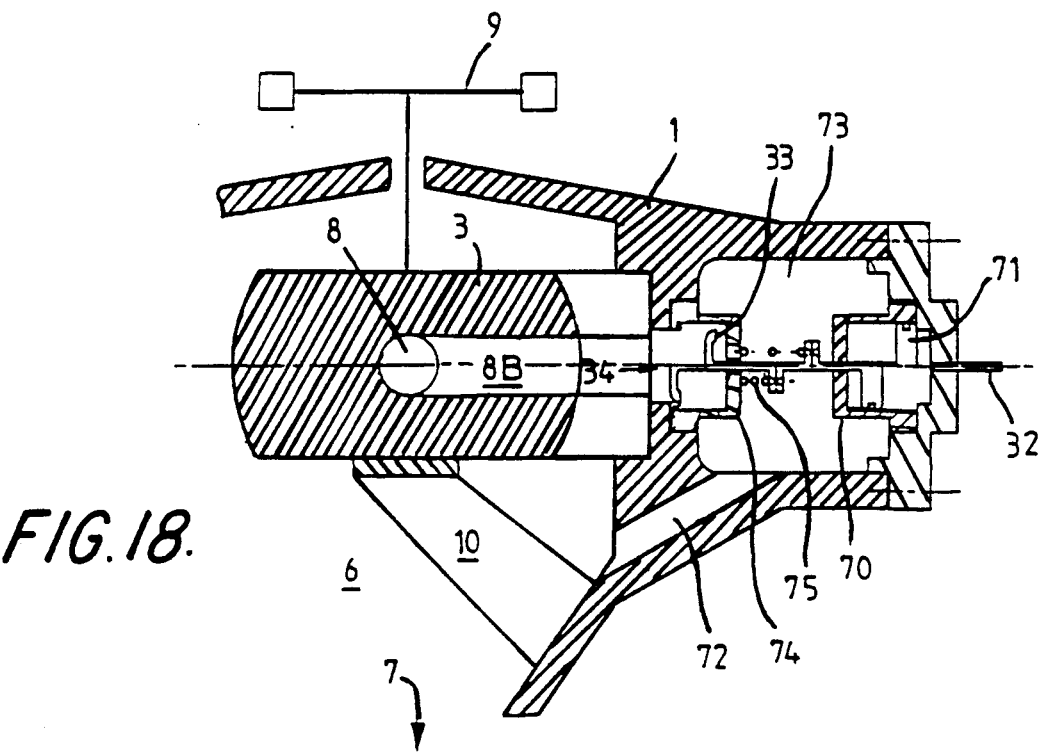
FIG. 18 is a view in elevation and partly in cross-section on the line XVIII—XVIII in FIG. 16, to a larger scale.

In the embodiment shown in FIGS. 16 through 18 the vacuum-breaker valve 41 mounted in the port 2D is adapted to be connected by a pipe 32 to the supply pipe 30A upstream of the non-return valve 29A and comprises means for opening it if, in the open position of the valve, the pressure in the passage of the valve member is higher than the pressure in the supply pipe.

FIGS. 17 and 18 show the vacuum-breaker 41 in more detail. It comprises a valve member 33 selectively closing a vent port 34 into which the passage 8, 8B of the valve member opens in the open position of the valve and a cylinder 70 adapted to be connected to the supply pipe 30A by the pipe 32 in which is disposed a piston 71 coupled to the valve member 33 and having a surface area S1 similar to the surface area S2 of the valve member 33, so that when the pressure in the passage is higher than the pressure in the supply pipe the piston 71 adopts a position in which the valve member opens the vent port 34, as shown in the righthand half-section. The venting is done through a pipe 72 (see FIG. 18) connecting the chamber 6 and a chamber 73 into which the port 34 opens through the support 74.

If there is any tendency for fluid to flow from the installation towards the supply, and if there is no valve 29B (as the latter is not indispensible) or if there is a valve but it is defective, the valve 29A closes, the pressure in the passage 8, 8B becomes higher than the pressure in the pipe 30A and the valve 41 opens, venting the passage to the atmosphere.

The vacuum-breaker 41 further comprises a spring 75 urging the piston 71 towards a position in which the valve member 33 opens the port 34, so that the vacuum-breaker opens although the pressure in the supply pipe 30A is still slightly higher than that in the passage, meaning that there is some safety margin, of 0.2 bars, for example.

Furthermore, it is preferable for the valve 29A to be calibrated so that it does not open until after the piston 71 has moved to a position in which the valve member 33 closes the port 34, for example, with a difference in pressure of 0.4 bars between the inlet and outlet sides of the valve 29A.

This prevents any leakage through the vacuum-breaker when flow of fluid from the supply to the installation begins.

Figure 19:
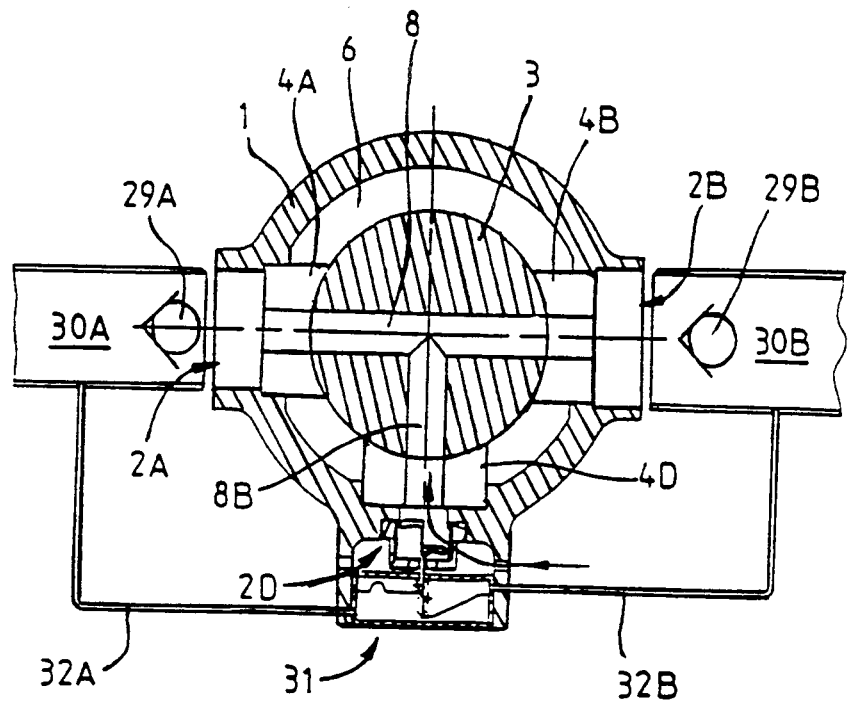
FIGS. 19 and 20 show in a similar way to FIGS. 15 and 17 another embodiment of the fluid control device in which the vacuum-breaker is responsive to the difference between the pressures in the supply pipe and the installation pipe.
Figure 20:
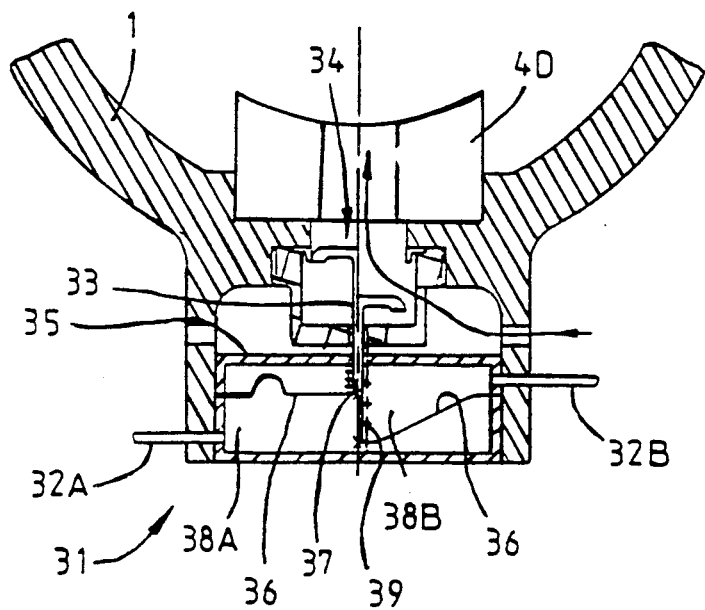

In the embodiment shown in FIGS. 19 and 20 the vacuum-breaker valve 31 mounted in the port 2D is adapted to be connected by a pipe 32A to the supply pipe 30A and by a pipe 32B to the installation pipe 30B, respectively upstream or downstream of the non-return valve 29A or 29B, and comprises means for opening it if the pressure in the installation pipe 30B is higher than the pressure in the supply pipe 30A. The valve member 33 is in this instance connected to a cylinder 35 divided by a diaphragm 36 disposed transversely to a rod 37 of the valve member and linked to that rod, into two chambers 38A and 38B respectively adapted to be connected to the supply pipe and to the installation pipe by the pipe 32A and the pipe 32B. If the pressure in the installation pipe 30B is higher than that in the supply pipe 30A the diaphragm adopts a position in which the valve member 33 opens the vent port 34, as shown in the righthand half-section.

If there is any tendency for fluid to flow from the installation towards the supply then the valve 29A and/or 29B closes, the pressure in the pipe 30B becomes higher than the pressure in the pipe 30A and the valve 31 opens, venting the passage to the atmosphere.

The spring 39 of the valve member 31 is comparable with that of the valve member 41 and the valve 29A is preferably calibrated in a similar way to that of the device from FIGS. 16 through 18 relative to this spring.

It will be noted that if there is a valve 29B the valve 41 has in relation to the valve 31 the advantage of not responding to pressure rises in the installation pipe unless this is necessary, in other words only if the valve 29B is defective.

As an alternative a diaphragm may be used for the vacuum-breaker 41 instead of the piston 71 and a piston for the vacuum-breaker 31 instead of the diaphragm 36.

Figure 21:
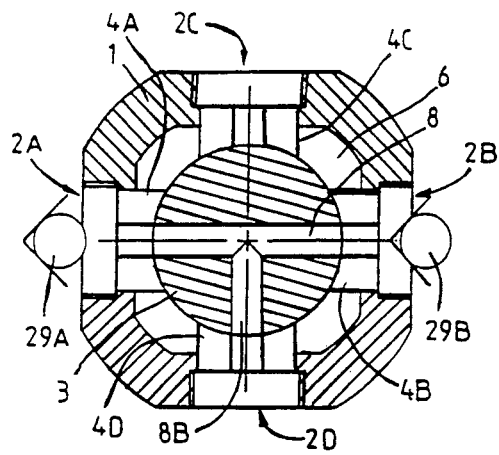
FIG. 21 is a view similar to FIG. 11 for an alternative embodiment of the valve further comprising a port for mounting a vacuum-breaker.

The valve forming part of the operating device shown in FIG. 21 comprises a shell casing with first, second and third ports 2A, 2B and 2C adapted to be connected to a fluid pipe and a port 2D for mounting a vacuum-breaker valve with a corresponding sleeve 4D. The first and second ports 2A and 2B are diametrally opposed on a first diameter and the third port 2C and the port 2D for mounting a vacuum-breaker are diametrally opposed on a diameter transverse to said first diameter. The passage in the valve member is T-shaped with a diametral part 8 to the centre of which is transversely connected a radial part 8B.

In the closed position of the valve the orifice of the radial part 8B is disposed between the port 2D for mounting a vacuum-breaker and the second port 2B, one of the orifices of the diametral part 8 between the ports 2A and 2D and the other orifice between the ports 2B and 2C. The four ports 2A and 2D are closed, sealing being provided by contact between the valve member and the respective sleeves. It will be noted that in this position there is at least one portion of the chamber 6 situated between any pair of sealing areas closing the ports of the valve.

On each side of this closed position the valve member 3 has a respective open position in which by clockwise rotation the port 2B is placed in communication with the ports 2A and 2D while the port 2C is closed (this position is that shown in FIG. 21) or by anticlockwise rotation the port 2B is placed in communication with the ports 2C and 2D while the port 2A is closed.

The necessary rotations through one eighth-turn for moving from the closed position to one of the open positions are achieved by operating control and indexing means identical to those shown in FIG. 12.

The portion of the foregoing description relating to the use of the valve from FIGS. 11 through 14 is equally applicable to this valve, as is the part relating to the combination of the valves from FIGS. 15 through 20 with a non-return valve on the ports 2A and 2B and a vacuum-breaker on the port 2D, for the open position shown in FIG. 21.

Figure 22:
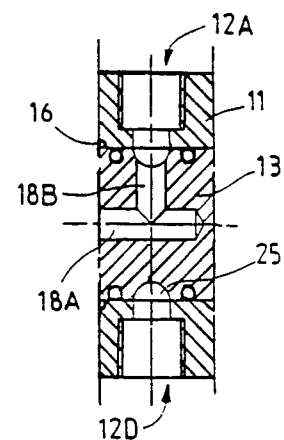
FIG. 22 is a partial view of an alternative embodiment of the valve from FIGS. 3 and 4 provided with a port for mounting a vacuum-breaker.

FIG. 22 is a partial cross-section showing modifications to the valve from FIGS. 3 and 4 so that a vacuum-breaker valve can be fitted to it.

The cylinder 11 further comprises a port 12D for mounting a vacuum-breaker valve, centred on an axis contained in the same plane transverse to the cylinder as the axis of the first port 12A and the passage in the piston further comprises an annular groove 25 formed in its lateral surface, centred on a plane transverse to the piston containing the axis of the radial portion 18B of the passage. Thus in the open position shown in FIG. 22 the port for mounting a vacuum-breaker is connected to the ports 12A and 12B. A valve of this kind is used in a similar way to the valve described previously with reference to FIGS. 15 through 20, the ports 12A, 12B and 12D respectively corresponding to the ports 2A, 2B and 2D.

Figure 23:
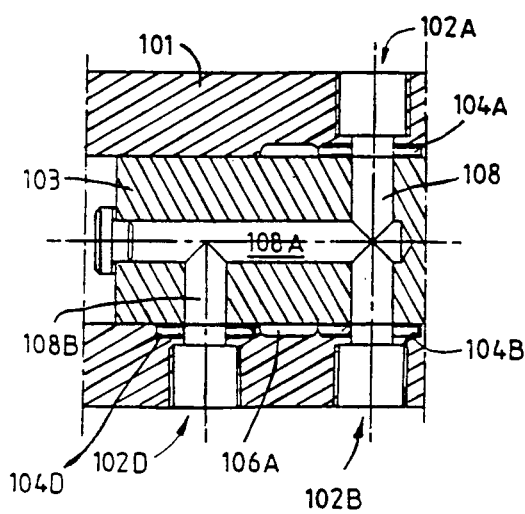
FIG. 23 is a similar view for the valve from FIGS. 5 through 7 or from that from FIGS. 8 through 10.

FIG. 23 is a partial cross-section relating to the valve from FIGS. 5 through 7 and that from FIGS. 8 through 10, showing modifications so that a vacuum-breaker valve can be fitted to it.

In the case of the valve from FIGS. 5 through 7, the cylinder 101 further comprises a port 102D for mounting a vacuum-breaker valve axially offset relative to the first and second ports 102A and 102B and for which a seal 104D similar to the seals 104A and 104B is provided and the piston incorporates a passage having an axial portion 108A connected to the diametral portion 108 and to which is connected a radial portion 108B, the orifice of the latter being aligned with the port 102D in the open position of the valve, shown in FIG. 23, in which position the port for mounting a vacuum-breaker is connected to the ports 102A and 102B. A valve of this kind is used in a similar way that from FIG. 22.

In the case of the valve from FIGS. 8 through 10, the cylinder 101 simply comprises an additional port 102D at the location of the pad 109A which is replaced by the seal 104D. Thus in the open position shown, which corresponds to that of FIG. 10, the port for mounting a vacuum-breaker is in communication with the first and second ports 102A and 102B. This valve is used in a similar way to that from FIG. 21 but the vacuum-breaker is not connected to the passage in the open position corresponding to FIG. 8.

Figure 24:
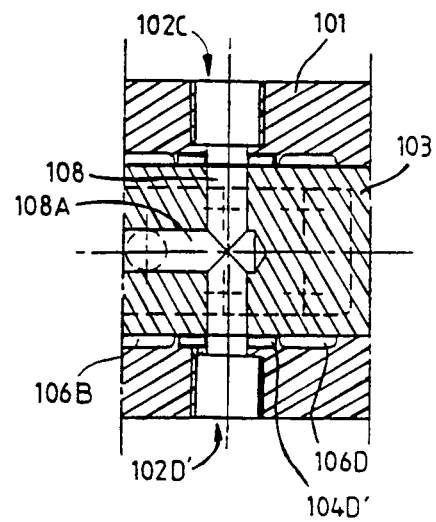
FIG. 24 is also a similar view for the valve from FIGS. 8 through 10.

FIG. 24 shows another modification to the valve from FIGS. 8 through 10 enabling the passage to be connected to a vacuum-breaker in this position, which modification may optionally be combined with that shown in FIG. 23, according to the requirements of the user. A port 102D' is simply provided in place of the pad 109B which is replaced by a seal 104D'.

Figure 25:
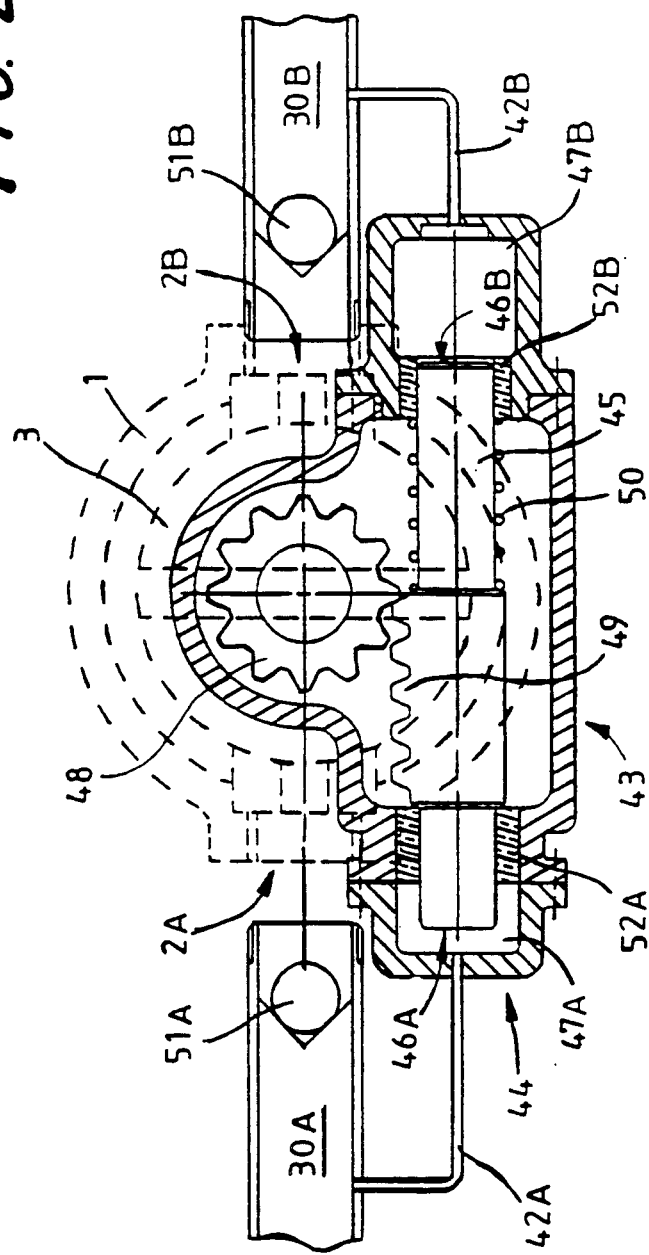
FIGS. 25 and 26 show a device for protection against backflow of fluid respectively comprising the valve from FIGS. 1 and 2 or that from FIGS. 5 through 7 with no controlling handwheel or handle, a system controlling its valve member in accordance with the difference in pressure between the pipes and a non-return valve on each of the fluid ports.

The fluid backflow protection device shown in FIG. 25 comprises a valve corresponding to that from FIGS. 1 and 2, but with no control handwheel, shown in chain-dotted outline. It is adapted to be placed between a fluid supply main and a consumption installation, a supply pipe 30A being adapted to be connected to the first port 2A and an installation pipe 30B to the second port 2B. The protection device further comprises a system 43 for controlling the valve member 3 of the valve adapted to be connected respectively by pipes 42A and 42B to the pipes 30A and 30B and comprising means for moving the valve member to the closed position if the pressure in the installation pipe 30B is higher than the pressure in the supply pipe 30A. The control system therefore disconnects the supply from the installation in these circumstances.

The control system 43 includes a cylinder 44 in which moves a piston 45 having at each end a respective surface 46A or 46B moving in a chamber 47A or 47B respectively communicating with the supply pipe 30A and the installation pipe 30B, the piston being coupled to the valve member by a pinion 48 coaxial with the valve member and a rack 49 attached to the piston. The surfaces 46A and 46B are of equal area so that when the pressure in the installation pipe is higher than the pressure in the supply pipe the piston assumes a position in which the valve member is in the closed position, as shown in FIG. 25. It will be noted that the position shown is the extreme closed position, in which the valve member has rotated through a quarter-turn, but that a much smaller rotation is sufficient to select the closed position.

The control system preferably comprises a spring 50 urging the piston 45 into a position in which the valve member of the valve is in the closed position, that is to say towards the left in FIG. 5, so that the valve member moves to the closed position if the difference between the pressure in the supply pipe and that in the installation pipe drops below a predetermined low threshold, which corresponds to a safety margin similar to that previously described with reference to the spring of the vacuum-breakers 31 and 41.

Furthermore, for creating a marked difference in pressure when there is any tendency for backflow of fluid, at least one non-return valve is provided on the first or the second port, closing towards the supply and opening towards the installation, in this instance there being a valve on each of the first and second ports, respectively 51A and 51B, for increased safety.

The recess 80 of the chamber 47B enables pressure to be applied to the surface 46B even if it is butted up against the wall into which the pipe 42B opens.

It will be noted in relation to the seal between the piston 45 and the chambers 47A and 47B that instead of using cylindrical seals 52A and 52B it might be advantageous to provide a diaphragm to reduce friction.

It is also possible to control in a similar way the valve from FIGS. 3 and 4, for example by providing surfaces like the surfaces 46A and 46B at the ends of the piston 13, chambers corresponding to the chambers 47A and 47B being provided in the cylinder 11.

Figure 26:
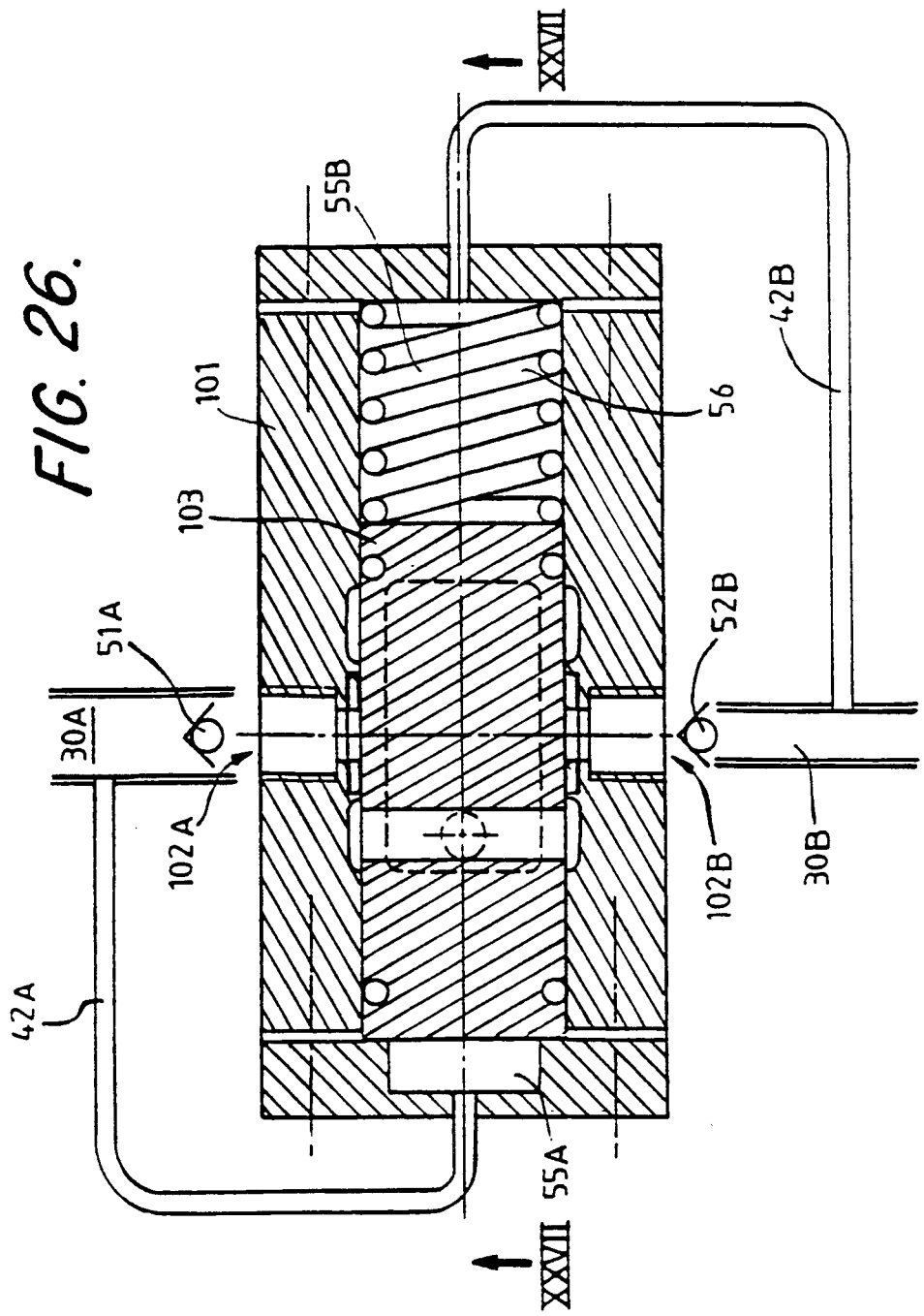
Figure 27:
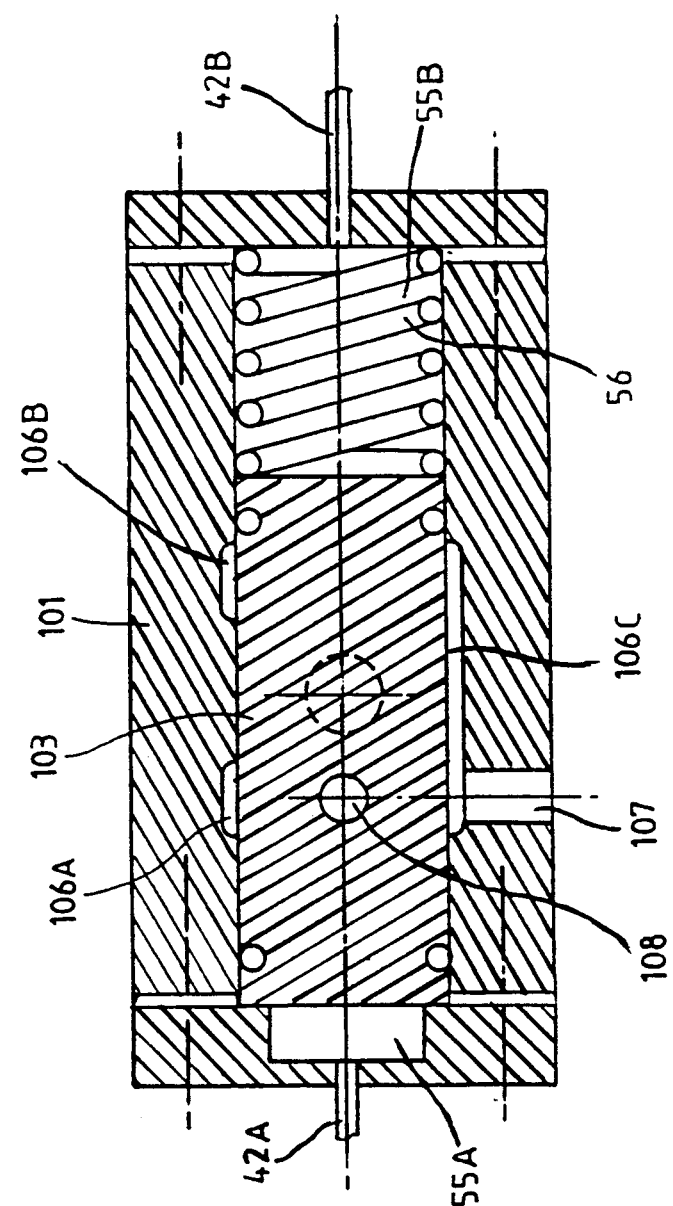
FIG. 27 is a view in elevation in cross-section on the line XXVII—XXVII in FIG. 26.

The same applies to the valve from FIGS. 5 through 7, as shown in FIGS. 26 and 27, where the chambers 55A and 55B correspond to the chambers 47A and 47B and the spring 56 corresponds to the spring 50.

Of course, the invention is not limited to the embodiments described and shown in the figures but to the contrary encompasses all variants thereof that might suggest themselves to those skilled in the art.

We claim:

1. Valve comprising a valve body with at least first and second ports adapted to be connected to a fluid pipe;

a mobile valve member within the valve body, having an open position in which said first and second ports communicate via a passage in the valve member, and a closed position in which the valve member provides a closing off for each of said first and second ports;

respective sealing areas for sealing said closing off of the first and second ports when in the closed position;

a chamber exterior to the valve member and provided with a vent opening to free air, disposed between said sealing areas in the closed position of the valve member, whereby possible leakages at said sealing areas in the closed position are collected in said chamber, vented to atmosphere and removed from the valve through said vent;

said valve body is a shell casing (1), said valve member (3) turns in the shell casing in which it is mounted by means of sleeves (4A, 4B) coaxial with the ports that the latter comprises, and said chamber (6) is a space between the shell casing and the valve member due to the fact that said sleeves project relative to the inside wall of the shell casing; and said shell casing (1) comprises as ports adapted to be connected to a fluid pipe said first and second ports (2A, 2B) and a third port (2C) and a port (2D) for mounting a vacuum-breaker valve, the first and the second ports being diametrally opposed on a first diameter and the third port being diametrically opposed to the port for mounting a vacuum-breaker on a diameter transverse to said first diameter, and the passage of the valve member (3) is T-shaped with a diametrical part (8) to the center of which is transversely connected a radial part (8B), the orifice of the radial part being disposed in the closed position of the valve between the port (2D) for mounting a vacuum-breaker and the second port (2B), a first orifice of the diametral part between the first port and the port for mounting a vacuum-breaker (2A, 2D) and the second orifice of the diametral part between the second and third ports (2B, 2C).

2. Fluid control devices adapted to be inserted between a fluid supply system and a consumption installation comprising:
 (a) a valve comprising:
  (1) a valve body with at least a first port (2A, 12A, 102A) adapted to be connected to a supply pipe (30A), and a second port (2B, 12B, 102B) adapted to be connected to an installation pipe;
  (2) a mobile valve member within the valve body, having an open position in which said first and second ports communicate via a passage in the valve member, and a closed position in which the valve member provides a closing off for each of said first and second ports;
  (3) respective sealing areas for sealing said closing off of the first and second ports when in the closed position;
  (4) a chamber exterior to the valve member and provided with a vent opening to free air, disposed between said sealing areas in the closed position of the valve member, whereby possible leakages at said sealing areas in the closed position are collected in said chamber, vented to atmosphere and removed from the valve through said vent;
  wherein said valve body also comprises a port (2D, 12D, 102D) for mounting a vacuum-breaker valve and the valve member (3, 13, 103) comprises a passage adapted in said open position of the valve to connect said port for mounting a vacuum-breaker to said first and second ports; and
 (b) a vacuum-breaker valve (31, 40, 41) mounted in said port for mounting a vacuum-breaker (2D, 12D, 102D), and;
 (c) a non-return valve (29A, 29B) mounted on at least one of said first and second ports, closing towards the supply and opening towards the installation.

3. Device according to claim 2 characterized in that said vacuum-breaker valve (40) comprises means for opening it when in the open position of the valve the pressure in the passage is lower than atmospheric pressure.

4. Device according to claim 2 characterized in that a non-return valve (29A) is mounted on said first port, said vacuum-breaker valve (41) is adapted to be connected to the supply pipe (30A) upstream of the non-return valve (29A) mounted on the first port and the vacuum-breaker valve (41) comprises means for opening it when in the open position of the valve the pressure in the passage is higher than the pressure in the supply pipe.

5. Device according to claim 4 characterized in that said vacuum-breaker valve comprises a valve member (33) selectively closing a port (34) venting to the atmosphere into which the passage of the valve member opens in the open position of the valve and a cylinder (70) adapted to be connected to the supply pipe in which is disposed a diaphragm coupled to said valve member (33) and having a surface area (51) similar to the surface area (52) of the valve member, the diaphragm assuming a position in which the valve member opens the vent port when the pressure in the passage is higher than that in the supply pipe.

6. Device according to claim 5 characterized in that said vacuum-breaker valve (41) further comprises a spring (75) urging said diaphragm towards a position in which the valve member (33) opens the port (34) venting to atmosphere.

7. Device according to claim 6 characterized in that the non-return valve (29A) on the first port (2A, 12A, 102A) is calibrated so as to open only after said diaphragm has moved to a position in which the valve member closes the port venting to atmosphere.

8. Device according to claim 4 characterized in that said vacuum-breaker valve comprises a valve member (33) selectively closing a port (34) venting to the atmosphere into which the passage of the valve member opens in the open position of the valve and a cylinder (70) adapted to be connected to the supply pipe in which is disposed a piston (71) coupled to said valve member (33) and having a surface area (51) similar to the surface area (52) of the valve member, the piston assuming a position in which the valve member opens the vent port when the pressure in the passage is higher than that in the supply pipe.

9. Device according to claim 8 characterized in that said vacuum-breaker valve (41) further comprises a spring (75) urging said piston (71) towards a position in which the valve member (33) opens the port (34) venting to atmosphere.

10. Device according to claim 9 characterized in that the non-return valve (29A) on the first port (2A, 12A, 102A) is calibrated so as to open only after said piston (71) has moved to a position in which the valve member closes the port venting to atmosphere.

11. Device according to claim 2 characterized in that said vacuum-breaker valve (31) is adapted to be connected to said supply and installation pipes (30A, 30B) respectively up-stream and downstream of the non-return valve on a port and the valve comprises means for opening it when the pressure in the installation pipe (30B) is higher than the pressure in the supply pipe (30A).

12. Device according to claim 11 characterized in that said vacuum-breaker valve comprises a valve member (33) selectively opening a port (34) venting to atmosphere and a cylinder (35) divided, by a piston transversely to a rod (37) of the valve member and coupled to the rod, into two chambers (38A, 38B) respectively adapted to be connected to the supply pipe (30A) and to the installation pipe (30B).

13. Device according to claim 12 characterized in that said vacuum-breaker valve (31) further comprises a spring (39) urging said piston towards a position in which the valve member (33) opens the port (34) venting to atmosphere.

14. Device according to claim 13 wherein a non-return valve (29A) is mounted on the first port (2A, 12A, 102A) characterized in that the non-return valve (29) is calibrated so as to open only after said piston has moved to a position in which the valve member closes the port venting to atmosphere.

15. Device according to claim 11 characterized in that said vacuum-breaker valve comprises a valve member (33) selectively opening a port (34) venting to atmosphere and a cylinder (35) divided, by a diaphragm (36) disposed transversely to a rod (37) of the valve member and coupled to the rod, into two chambers (38A, 38B) respectively adapted to be connected to the supply pipe (30A) and to the installation pipe (30B), the diaphragm (36) assuming if the pressure in the installation pipe is higher than that in the supply pipe a position in which the valve member (33) opens the port (34) venting to atmosphere.

16. Device according to claim 15 characterized in that said vacuum-breaker valve (31) further comprises a spring (39) urging said diaphragm (36) towards a position in which the valve member (33) opens the port (34) venting to atmosphere.

17. Device according to claim 16 wherein a non-return valve (29A) is mounted on the first port (2A, 12A, 102A) characterized in that the non-return valve (29) is calibrated so as to open only after said diaphragm (36) has moved to a position in which the valve member closes the port venting to atmosphere.

18. Device according to claim 2, characterized in that said valve body is a cylinder (11), said valve member is a piston (13) sliding in said cylinder and said chamber (16) is annular recess on the interior wall of the cylinder between said first and second ports (12A, 12B) the latter being formed in the lateral wall of said cylinder and axially offset relative to each other;

said cylinder comprises as ports adapted to be connected to a fluid pipe only said first and second ports (12A, 12B) and said piston comprises a passage having an axial portion (18A) to which connect two radial portions (18B, 18C); and said cylinder further comprises a port (12D) for mounting a plant transverse to the cylinder as the axis of the first port (12A) and the passage in the piston comprises an annular groove (25) formed in its lateral surface and centred on a plane transverse to the piston containing the axis of one of the radial portions (18B), the latter connecting to the first port (12A) in the open position of the valve.

19. Device according to claim 2, characterized in that said body is a cylinder (101) in the lateral wall of which the first and second ports (102A, 102B) adapted to be connected to a fluid pipe are diametrally opposed, said valve member is a piston (103) sliding in said cylinder and said chamber comprises an annular recess (106A, 106B) in the inside wall of the cylinder on either side of said first and second ports and a longitudinal recess (106C) at the bottom into which the annular recess (106A, 106B) and the vent orifice (107) open;

said cylinder (101) comprises as ports adapted to be connected to a fluid pipe only said first and second ports (102A, 102B) and said piston (103) comprises a diametral passage (108); and said cylinder (101) further comprises a port (102D) for mounting a vacuum-breaker valve axially offset relative to the first and second ports (102A, 102B) and the piston comprises a passage having a diametral portion (108) to which is connected an axial portion (108A) to which is connected a radial portion (108B), the orifice of the latter facing the port (102D) for mounting a vacuum-breaker while the orifices of the diametral portion faces the first and second ports (102A, 102B) in the open position of the valve.

20. Device according to claim 2, characterized in that:
- said body is a cylinder (101) in the lateral wall of which the first and second ports (102A, 102B) adapted to be connected to a fluid pipe are diametrally opposed, said valve member is a piston (103) sliding in said cylinder and said chamber comprises an annular recess (106A, 106B) in the inside wall of the cylinder on either side of said first and second ports and a longitudinal recess (106C) at the bottom into which the annular recesses (106A, 106B) and the vent orifice (107) open;
- said cylinder comprises as ports adapted to be connected to a fluid pipe said first and second ports (102A, 102B) and a third port (102C) axially offset relative to the latter, situated opposite them relative to a first annular recess in the inside wall of the cylinder surrounding the first and the second ports, a third annular recess (106D) being formed on the other side of the third port, and the passage in the piston comprises a diametral portion (108) to which connects an axial portion (108A) to which connects a radial portion (108B), the orifices of the diametral portion facing said first annular recess (106B) while the orifice of the radial portion faces the annular recess (106A) situated opposite the first annular recess relative to the first and second ports in a closed position of the valve to each side of which it has an open position in which the second port is respectively in communication with the first and the third port while said cylinder (101) comprises a port (102D) for mounting a vacuum-breaker valve situated opposite the third port relative to the first and second ports, facing which, in the open position of the valve, is the orifice of the radial portion of the passage of the piston, in which open position the first and second ports are in communication.

21. Device according to claim 2, characterized in that:
- said body is a cylinder (101) in the lateral wall of which the first and second ports (102A, 102B) adapted to be connected to a fluid pipe are diametrally opposed, said valve member is a piston (103) sliding in said cylinder and said chamber comprises an annular recess (106A, 106B) in the inside wall of the cylinder on either side of said first and second ports and a longitudinal recess (106C) at the bottom into which the annular recesses (106A, 106B) and the vent orifice (107) open;
- said cylinder comprises as ports adapted to be connected to a fluid pipe said first and second ports (102A, 102B) and a third port (102C) axially offset relative to the latter, situated opposite them relative to a first annular recess in the inside wall of the cylinder surrounding the first and the second ports, a third annular recess (106D) being formed on the other side of the third port, and passage in the piston comprises a diametral portion (108) to which connects an axial portion (108A) to which connects a radial portion (108B), the orifices of the diametral portion facing said first annular recess (106B) while the orifice of the radial portion faces the annular recess (106A) situated opposite the first annular recess relative to the first and second ports in a closed position of the valve to each side of which it has an open position in which the second port is respectively in communication with the first and the third port while respectively the third and the first port are closed; and
- said cylinder comprises a port (102D') for mounting a vacuum-breaker valve diametrally opposed to said third port.

22. Device according to claim 2, characterized in that:
- said valve body is a shell casing (1), said valve member (3) turns in the shell casing in which it is mounted by means of sleeves (4A, 4B) coaxial with the ports that the latter comprises, and said chamber (6) is a space between the shell casing and the valve member due to the fact that said sleeves project relative to the inside of the shell casing;
- said shell casing (1) comprises as ports adapted to be connected to a fluid pipe, only said first and second ports (2A, 2B) these ports are diametrally opposed and said valve member (3) comprises a diametral passage (8); and
- said shell casing further comprises a port (2D) for mounting a vacuum-breaker valve disposed on a diameter transverse to that on which said first and second ports (2A, 2B) are disposed and the passage in the valve member is T-shaped, further comprising a radial portion (8B) connecting transversely to the centre of said diametral passage (8), the orifice of said radial portion being disposed in the closed position of the valve between the port for mounting a vacuum-breaker (2D) and one of said first and second ports (2A, 2B).

* * * * *